United States Patent [19]
Jaskowiak et al.

[11] Patent Number: 5,592,863
[45] Date of Patent: Jan. 14, 1997

[54] CRYOGENIC MACHINING OF SOFT/DUCTILE MATERIALS

[75] Inventors: Timothy R. Jaskowiak, Webster; Daniel R. Gilmore, III, Victor; Thomas L. DiGravio, Ontario, all of N.Y.

[73] Assignee: Xerox Corporation, Stamford, Conn.

[21] Appl. No.: 533,580

[22] Filed: Sep. 25, 1995

[51] Int. Cl.⁶ ........................................ B23B 25/02
[52] U.S. Cl. ........................ 82/1.11; 82/50; 82/901; 407/6; 407/11; 408/56
[58] Field of Search ................ 407/6, 11; 408/56, 408/57, 59, 60; 82/1.11, 50, 901, 173

[56] References Cited

U.S. PATENT DOCUMENTS

| | | | |
|---|---|---|---|
| 3,900,975 | 8/1975 | Lightstone et al. | 51/322 |
| 3,971,114 | 7/1976 | Dudley | 82/173 X |
| 3,979,981 | 9/1976 | Lightstone et al. | 83/15 |
| 4,447,952 | 5/1984 | Elkins | 30/361 |
| 4,621,547 | 11/1986 | Yankoff | 408/57 X |
| 4,643,056 | 2/1987 | Arehart et al. | 407/11 X |
| 4,778,315 | 10/1988 | Duffy et al. | 82/901 X |
| 4,791,840 | 12/1988 | De Rosier et al. | 82/1 C |
| 4,829,859 | 5/1989 | Yankoff | 82/1.11 |
| 5,103,701 | 4/1992 | Lundin et al. | 82/173 |
| 5,190,421 | 3/1993 | Wen et al. | 407/11 |
| 5,222,332 | 6/1993 | Mains, Jr. | 51/320 |
| 5,340,242 | 8/1994 | Armbrust et al. | 407/11 |
| 5,341,608 | 8/1994 | Mains, Jr. | 51/320 |

*Primary Examiner*—M. Rachuba
*Assistant Examiner*—Henry W. H. Tsai
*Attorney, Agent, or Firm*—John S. Wagley

[57] ABSTRACT

A method for producing discontinuous chips during the machining of a work piece by a cutting tool is provided. The method includes the steps of engaging the cutting tool into the workpiece to produce a continuous chip and directing a stream of cryogen toward the continuous chip, so as to rapidly cool the continuous chip and fracture the continuous chip into the discontinuous chips.

20 Claims, 1 Drawing Sheet

CRYOGENIC MACHINING OF SOFT/DUCTILE MATERIALS

The present invention relates to an apparatus for machining workpieces. More specifically, the invention relates to a apparatus of breaking up chips generated in a machining operation.

Many mechanical components, in particular those requiring accurate tolerances, are manufactured, at least in part, by being machined or turned on a turning lathe or similar device. A lathe is a machine that includes a frame to which a spindle is rotatably secured. The rotating spindle is driven by an electric motor. A workpiece is removably secured to the spindle. A cutting tool is secured to a slide which is mounted to the frame. The slide is driven axially along the frame by an appropriate method such as mechanical, hydraulic or electrical, for example by an electric motor. The tool engages the workpiece. Since the tool is harder than the workpiece, material is sheared from the workpiece, whereby the workpiece is machined into precise round dimensions.

During the machine process the cutting tool moves in a combination of axial and radial directions while the workpiece rotates. The tool removes a spirally shaped band of material from the workpiece. Inherently, this spiral band takes the form of a continuous chip. The continuous chip is a long standing problem in the machine of workpieces on lathes. The continuous chip forms a wound ball often referred to as a "bird nest" of chips. When the continuous chip finally breaks the "bird nest" is so large that it can not escape from the machine and thus remains trapped within the machine or on the workpiece. The "bird nests" tend to accumulate between the workpiece and the cutting tool. The "bird nests" rub against the machined surface of the workpiece causing damage thereto.

For materials with low and intermediate ductility, adjustments in the feed rate, the rate at which the tool travels in the axial direction along the workpiece, the depth of cut, the distance from the tool tip to the periphery of the workpiece, and the rotational speed of the workpiece are typically adjusted to provide for a chip with sufficient mass and heat to break up or become discontinuous. For very ductile materials, this process is not usually sufficient.

For intermediate to somewhat more ductile materials, the shape of the cutting tool may be adjusted. For example, the cutting tool may have a chip breaker or surface on the cutting tool which causes the chip to bend vigorously. The bending fractures the chip causing it to become discontinuous. The use of a cutting tool with a chip breaker reduces the life of the cutting tool and is successful only on intermediately ductile materials.

For very ductile materials such as brass and aluminum and more particularly for plastic materials, the use of speed, feed and depth of cut adjustments, as well as providing cutting tools with chip breakers, is not successful in causing the chip to become discontinuous. For these materials typically an operator must frequently interrupt the machining process to use a hook to remove the "bird nest" from the machine. This procedure is slow and time consuming and does not prevent the damage caused by the "bird nest" during the machining of the part.

As materials being machined are replaced by more lightweight and inexpensive materials, workpieces which typically have been made from less ductile metals are now being manufactured from more ductile plastics. Certain plastics, in particular, ABS materials are particularly ductile and generate a continuous chip when turned. To avoid damage to the workpiece, in particular, damage to the machined surface of the workpiece, the workpiece is thoroughly frozen to cryogenic temperatures prior to loading the workpiece into the machine. Not only does this process add an additional step in the machining of the workpiece, namely, placing and removing the ABS material into the freezer and the inherent delay in the processing of the workpiece, the freezing of the ABS material causes intolerable structural damage to the workpiece. The abrupt temperature change may cause cracking in workpieces with two or more materials, particularly if the materials have different coefficients of thermal expansion.

Devices for cooling the tool/workpiece interface are well known. Typically the following disclosures may be relevant to various aspects of the present invention:

U.S. Pat. No. 5,341,608 Patentee: Mains, Jr. Issue Date: Aug. 20, 1994

U.S. Pat. No. 5,222,332 Patentee: Mains, Jr. Issue Date: Jun. 29, 1993

U.S. Pat. No. 4,829,859 Patentee: Yankoff Issue Date: May 16, 1989

U.S. Pat. No. 4,791,840 Patentee: De Rosier et al. Issue Date: Dec. 20, 1988

U.S. Pat. No. 4,447,952 Patentee: Elkins Issue Date: May 15, 1984

U.S. Pat. No. 3,979,981 Patentee: Lightstone et al. Issue Date: Sep. 14, 1976

U.S. Pat. No. 3,900,975 Patentee: Lightstone et al. Issue Date: Aug. 26, 1975

U.S. Pat. No. 5,341,608 discloses an apparatus for removing solid material from a workpiece. A high velocity stream of ice is caused to impinge on the workpiece. Water is supplied at high pressure to a discharge nozzle with an orifice for forming a needle like stream. The water is cooled by a cryogenic gas by flowing the gas in a conduit around the stream to a temperature below the freezing point so that at least some of the stream is transformed to ice.

U.S. Pat. No. 5,222,332 discloses an apparatus for removing solid material from a workpiece. A high velocity stream of ice is caused to impinge on the workpiece. Water is supplied at high pressure to a discharge nozzle with an orifice for forming a needle like stream. The water is cooled before it reaches the nozzle to a temperature below the freezing point so that at least some of the stream is transformed to ice.

U.S. Pat. No. 4,829,859 discloses an apparatus for machining a workpiece with an insert in which a main pipe transmits a high velocity stream of water through a discharge opening in the pipe. A branch pipe is connected to the main pipe upstream of the opening and introduces liquid carbon dioxide to the water stream causing a portion of the water to turn to ice particles. The water and ice particles are converted to a vapor upon contact with the insert.

U.S. Pat. No. 4,791,840 discloses an apparatus in which liquid coolant is directed across a tool bit which forms a chip. The pressure and volume of the coolant are sufficient to impact the chip and break it into small fragments.

U.S. Pat. No. 4,447,952 discloses an apparatus for punching a hole in the hull of a ship. The device includes a flask of liquid nitrogen which is connected by tubing to the hull. The nitrogen cools the area in the hull where the hole is to be placed. A firing mechanism causes a primer cap to ignite a cartridge. The cartridge propels a velocity power ram against the hull forming the hole.

U.S. Pat. No. 3,979,981 discloses a process for shearing metal which includes cooling the work metal to a cryogenic temperature and then shearing the cooled metal.

U.S. Pat. No. 3,900,975 discloses a process for abrasively grinding copper including cooling the entire copper workpiece to a cryogenic temperature. The process also includes abrasively grinding the workpiece while the workpiece is immersed in a liquid nitrogen.

SUMMARY OF THE INVENTION

In accordance with one aspect of the present invention, there is provided a method for producing discontinuous chips during the machining of a work piece by a cutting tool. The method includes the steps of engaging the cutting tool into the workpiece to produce a continuous chip and directing a stream of cryogen toward the continuous chip, so as to rapidly cool the continuous chip and fracture the continuous chip into the discontinuous chips.

In accordance with another aspect of the present invention, there is provided an apparatus for producing discontinuous chips from a continuous chip during the machining of a work piece by a cutting tool. The apparatus includes a container for storing a cryogen and a conduit. The conduit has a first end connected to the container and a second end positioned so as to direct a stream of cryogen toward the continuous chip.

BRIEF DESCRIPTION OF THE DRAWINGS

The invention will be described in detail herein with reference to the following figures in which like reference numerals denote like elements and wherein.

Figure 1:
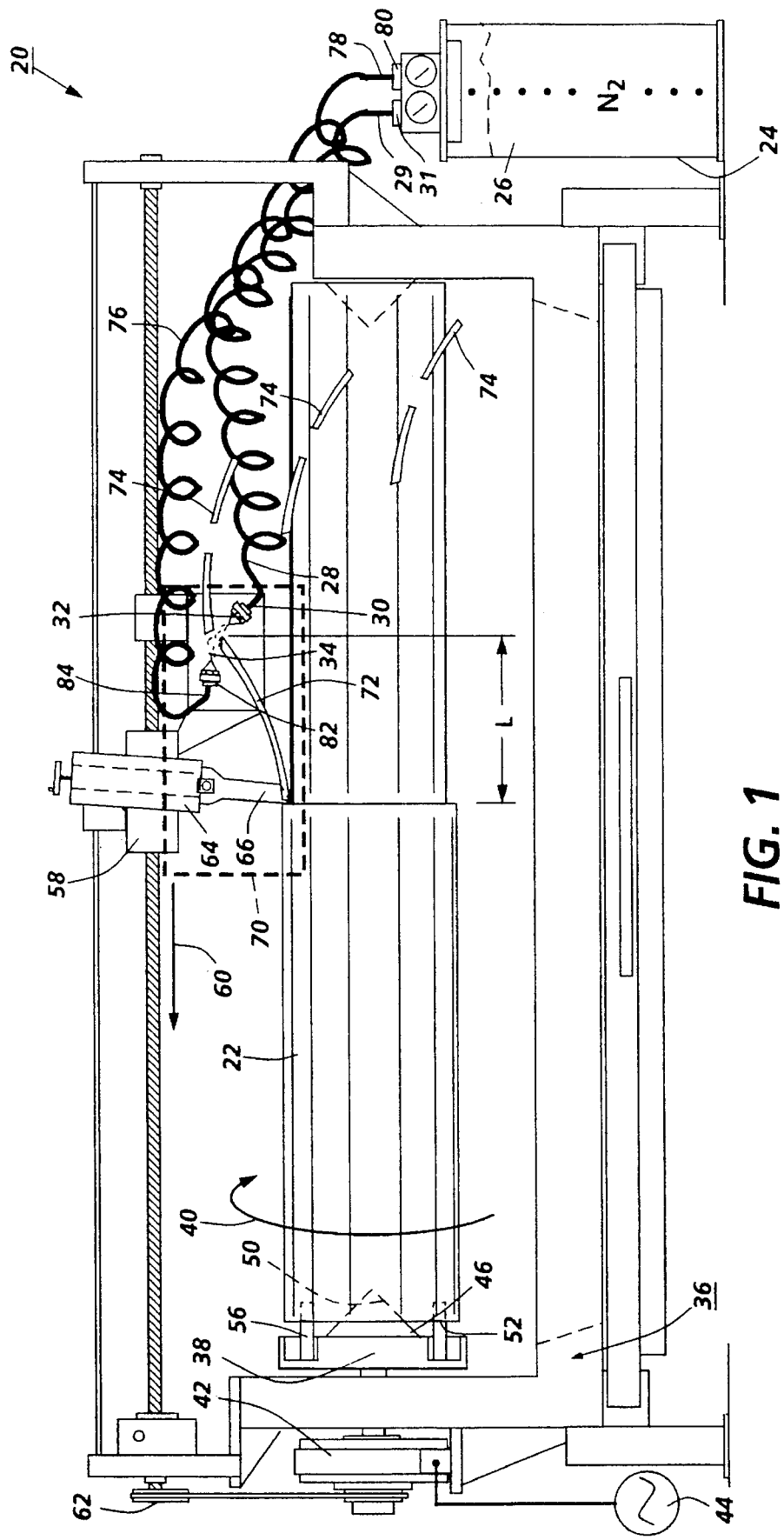
FIG. 1 is a schematic view of an apparatus for breaking the chips produced from the turning of ductile material according to the present invention.

According to the present invention and referring to FIG. 1, an apparatus 20 for producing a workpiece 22 is shown. The apparatus 20 includes a container 24 for holding a cryogenic material 26. The cryogenic material 26 may be any suitable material capable of absorbing large quantities of localized heat. For example, the cryogenic material 26 may be liquid carbon dioxide or liquid nitrogen. The container 24 may be any suitable container capable of containing the cryogenic material 26. Typically the container 24 is a commercially available metal cylinder or tank which contains the cryogenic material 26 under pressure. A conduit 28 is used to convey the liquid nitrogen 26 from a first end 29 of the conduit 28 adjacent the container 24 to a second end 30 of the conduit 28. Preferably a valve 31 is positioned between the first end 29 of the conduit 28 and the container 24. While the invention may be practiced with the second end 30 of the conduit 28 open to atmosphere, preferable, a nozzle 32 is connected to the second end 30 of the conduit 28. The nozzle 32 serves to direct the liquid nitrogen 26 in the proper direction and to serve as a valve to assist in the conversion of the liquid nitrogen 26 to a gaseous stream 34. The nozzle is made of any suitable durable material that is chemically nonreactive with the cryogenic material 26. The conversion of the liquid nitrogen 26 to nitrogen gas is a very endothermic process absorbing large amounts of heat.

The apparatus 20 may be utilized for the machining of any workpiece which produces continuous chips, for example, planing, but is particularly well suited for use with the turning of a workpiece on a lathe.

As shown in FIG. 1, the apparatus 20 is used in conjunction with a lathe 36. The lathe 36 may be any suitable turning lathe, for example, a computer numerically controlled (CNC) lathe commercially available, such as those manufactured by Toyoda of France. It should be appreciated that the invention may be practiced on any machine which produces continuous chips such as a screw machine or a chucking machine. The lathe 36 includes a head stock 38 which rotates in the direction of arrow 40. The headstock 38 may be driven in any suitable manner, but, preferably is driven by an electric motor 42 which is electrically connected to a power source 44. A center 46 extends outwardly from the head stock 38 and engages a center recess 50 centrally located in a first end 52 of a workpiece 22. A driver 56 attached to the head stock 38 interconnects with the workpiece 22 to transmit the torque necessary to rotate the workpiece in the direction of arrow 40. Alternatively the center 46 and driver 56 may be replaced by a collet or chuck (not shown).

The lathe 36 further includes a tool slide 58 which is driven in the direction of arrow 60. The slide 58 is driven by any suitable means such as by a gear train 62 from the motor 42, but alternatively may be driven by slide motor 62 which is connected to power source 44. A tool holder 64 is secured to the tool slide 58 and holds a cutting tool 66. The cutting tool 66 may be any tool capable of shearing the workpiece 22, but preferably is made of a hard material such as tool steel, carbide, ceramic or a diamond like material. A cutting zone 70 is located around the cutting tool 66. The cutting zone is an area proximate the cutting tool 66 as it contacts the workpiece 22. The nozzle 32 of the apparatus 20 is positioned pointing toward a continuous chip 72 coming from the cutting tool 66 in the cutting zone 70. The nozzle 32 directs the nitrogen gas 26 in a direction toward a chip 72. The nozzle 32 is positioned so that the gaseous stream 34 is directed onto the chip 72 at a distance L from the cutting tool 66. The distance L is chosen to optimize the effect of the cryogenic material in breaking the continuous chip 72. A distance L of approximately ⅜ inch has been found to be effective.

The shearing forces of the cutting tool 66 against the workpiece 22 cause the cutting tool 66 and the workpiece 22 adjacent the cutting tool to reach elevated temperatures. Preferably, the nozzle 32 directs the nitrogen gas 26 in a direction away from the cutting tool 66. Directing the stream 34 toward the cutting tool 66 may cause the hard brittle cutting tool 66 to shatter because of the rapid temperature change that the exposure to the cryogenic material 26 would cause.

Also, preferably the nozzle 32 is pointed away from the workpiece 22. If the nozzle 32 pointed toward the the workpiece 22, the extreme cooling of the nitrogen gas 26 may tend to either cause the workpiece 22 to shatter or crack or to cause other structural damage to the workpiece 22 because of the rapid temperature change that the exposure to the nitrogen gas 26 would cause.

Impinging the stream 34 onto the chip 72 in a very localized area around the nozzle 32 within the cutting zone 70 causes vast quantities of heat to be removed from the chip 72. Since the cooing of the chip 72 is so localized only an area within approximately one-half an inch of the chip 72 adjacent the nozzle 32 is significantly cooled. The workpiece and the cutting tool 66 are not significantly cooled. This rapid cooling causes the chip 72 to become extremely brittle and break into discontinuous chips 74.

While the invention may be practiced with one conduit and one nozzle, it may be advantageous in order to optimize cooling of the chip 72 to have a second conduit 76 to assist in the cooling of the chip 72. The second conduit 76 is similar to the first conduit 28 and is connected to container 24 at a first end 78 of the conduit 76. A second valve 80 controls the flow of nitrogen gas 24 from the container 24 to the conduit 76. A second nozzle 82 is located at second end 84 of the conduit 76 and directs the nitrogen gas 26 from the second conduit 76. It should be appreciated that the nozzles may be connected by a common conduit or that the nozzles may be connected to individual containers. Also three or more nozzles may be used.

By directing a cryogenic material toward the continuous chip within the cutting zone of a ductile workpiece, the otherwise continuous chip can be broken into small discontinuous chips which avoid damage to the machined work surface.

By freezing only the chip within the cutting zone, the step of freezing the part and the resultant delay in the processing of the workpiece can be avoided.

By directing the cryogen toward the chip and not significantly cooling the workpiece, damage to the workpiece from low temperatures can be avoided.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method for producing discontinuous chips during the machining of a workpiece by a cutting tool, comprising:

engaging the cutting tool with the workpiece to produce a continuous chip; and directing a stream of cryogen toward the continuous chip at a position spaced from the cutting tool and away from the workpiece, so as to rapidly cool the continuous chip and fracture the continuous chip into the discontinuous chips and so as to avoid damage to the workpiece caused by rapid cooling thereof by the stream of cryogen.

2. The method of claim 1, wherein said directing step comprises directing a stream of nitrogen toward the continuous chip.

3. The method of claim 1, wherein said directing step comprises directing the stream of cryogen away from the cutting tool.

4. The method of claim 1, wherein said directing step comprises directing a stream of cryogen toward the continuous chip at a position proximate to the cutting tool.

5. The method of claim 4, wherein said directing step comprises directing a stream of cryogen toward the continuous chip at a position within 1.00 inches of the cutting tool.

6. The method of claim 4, wherein said directing step comprises directing a stream of cryogen through a nozzle.

7. An apparatus for producing discontinuous chips from a continuous chip during the machining of a work piece by a cutting tool, comprising:

a container for storing a cryogen; and a conduit having a first end connected to said container and a second end positioned spaced from the workpiece and the cutting tool, the second end defining an opening in said conduit, the opening in the conduit pointed toward the continuous chip and away from the workpiece so as to direct a stream of cryogen toward the continuous chip and away from the workpiece and so as to avoid damage to the workpiece caused by rapid cooling thereof by the stream of cryogen.

8. The apparatus of claim 7, wherein said cryogen comprises nitrogen.

9. The apparatus of claim 7, wherein the chips comprise a plastic material.

10. The apparatus of claim 7, further comprising a nozzle connected to the second end of said conduit.

11. The apparatus of claim 7, wherein the second end of said conduit is so positioned to direct the stream of cryogen to contact the continuous chip at a position within 1.00 inches of the cutting tool.

12. The apparatus of claim 7, further comprising a second conduit having a first end connected to said container and a second end positioned so as to direct a stream of cryogen toward the continuous chip.

13. The apparatus of claim 7, further comprising a second nozzle connected to the second end of said second conduit.

14. A method for producing discontinuous chips during the machining of a plastic workpiece by a cutting tool, comprising:

engaging the cutting tool with the workpiece to produce a continuous chip; and directing a stream of cryogen toward the continuous chip from a position spaced from the cutting tool and away from the workpiece, so as to rapidly cool the continuous chip and fracture the continuous chip into the discontinuous chips and so as to avoid damage to the workpiece caused by rapid cooling thereof by the stream of cryogen.

15. The method of claim 14, wherein said directing step comprises directing a stream of nitrogen toward the continuous chip.

16. The method of claim 14, wherein said directing step comprises directing the stream of cryogen away from the cutting tool.

17. The method of claim 14, wherein said directing step comprises directing a stream of cryogen toward the continuous chip at a position proximate to the cutting tool.

18. The method of claim 14, wherein said directing step comprises directing a stream of cryogen toward the continuous chip to contact the continuous chip at a position within 1.00 inches of the cutting tool.

19. The method of claim 18, wherein said directing step comprises directing a stream of cryogen toward the continuous chip to contact the continuous chip at a position approximately 0.375 inches from the cutting tool.

20. The method of claim 14, wherein said engaging step comprises engaging the cutting tool with an ABS workpiece to produce a continuous chip.

* * * * *